United States Patent
Anttila et al.

(10) Patent No.: US 9,582,937 B2
(45) Date of Patent: Feb. 28, 2017

(54) METHOD, APPARATUS AND COMPUTER PROGRAM PRODUCT FOR DISPLAYING AN INDICATION OF AN OBJECT WITHIN A CURRENT FIELD OF VIEW

(75) Inventors: Akseli Anttila, Helsinki (FI); Younghee Jung, Tokyo (JP); Fumiko Ichikawa, Tokyo (JP); Raymond Paul Seymour, Tokyo (JP); Jan Gunter Chipchase, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 654 days.

(21) Appl. No.: 11/968,377

(22) Filed: Jan. 2, 2008

(65) Prior Publication Data

US 2009/0167919 A1    Jul. 2, 2009

(51) Int. Cl.
| | |
|---|---|
| *G06T 19/00* | (2011.01) |
| *G01S 19/13* | (2010.01) |
| *G01C 21/20* | (2006.01) |
| *G01S 5/02* | (2010.01) |
| *H04W 4/02* | (2009.01) |
| *H04W 64/00* | (2009.01) |

(52) U.S. Cl.
CPC ............ *G06T 19/006* (2013.01); *G01C 21/20* (2013.01); *G01S 5/0205* (2013.01); *G01S 19/13* (2013.01); *G01S 5/02* (2013.01); *H04W 4/02* (2013.01); *H04W 64/00* (2013.01)

(58) Field of Classification Search
CPC ....... G01S 19/13; G01S 5/0205; G01C 21/21; G01C 21/3682; G01C 21/3679; G06T 19/006; H04L 67/18; H04L 61/1594; H04M 1/72572; H04M 2250/52; G06F 17/3087; H04W 4/04; H04W 4/185; H04W 4/025; H04W 4/026; H04W 64/00

USPC .... 348/207.1, 333.02, 333.12; 345/158, 632, 345/633; 701/459, 523, 519
See application file for complete search history.

(56) References Cited

U.S. PATENT DOCUMENTS

| | | |
|---|---|---|
| 5,625,765 A | 4/1997 | Ellenby et al. |
| 5,682,332 A | 10/1997 | Ellenby et al. |
| 5,742,521 A | 4/1998 | Ellenby et al. |
| 5,815,411 A | 9/1998 | Ellenby et al. |
| 5,991,827 A | 11/1999 | Ellenby et al. |
| 6,031,545 A | 2/2000 | Ellenby et al. |
| 6,037,936 A | 3/2000 | Ellenby et al. |

(Continued)

FOREIGN PATENT DOCUMENTS

| | | |
|---|---|---|
| EP | 0 867 690 | 9/1998 |
| JP | 2008065092 A * | 3/2008 |

(Continued)

OTHER PUBLICATIONS

PCT Search Report and Written Opinion for Application No. PCT/IB2008/055152 dated Apr. 28, 2009.

*Primary Examiner* — John Villecco
(74) *Attorney, Agent, or Firm* — Alston & Bird LLP

(57) ABSTRACT

A method, apparatus and computer program product are provided for displaying an indication of an object when location information associated with the object describes a location within the current field of view of an imaging device. The indication of the object can be displayed within a map image, live image, etc., when the location information associated with the object describes a location within the current field of view of an imaging device.

13 Claims, 6 Drawing Sheets

(56) References Cited

U.S. PATENT DOCUMENTS

| | | | |
|---|---|---|---|
| 6,064,398 A | 5/2000 | Ellenby et al. | |
| 6,098,118 A | 8/2000 | Ellenby et al. | |
| 6,173,239 B1 | 1/2001 | Ellenby et al. | |
| 6,181,302 B1* | 1/2001 | Lynde | 359/632 |
| 6,208,353 B1* | 3/2001 | Ayer et al. | 345/634 |
| 6,278,461 B1 | 8/2001 | Ellenby et al. | |
| 6,307,556 B1 | 10/2001 | Ellenby et al. | |
| 6,346,938 B1 | 2/2002 | Chan et al. | |
| 6,396,475 B1 | 5/2002 | Ellenby et al. | |
| 6,414,696 B1 | 7/2002 | Ellenby et al. | |
| 6,522,292 B1 | 2/2003 | Ellenby et al. | |
| 6,535,210 B1 | 3/2003 | Ellenby et al. | |
| 6,690,370 B2 | 2/2004 | Ellenby et al. | |
| 6,795,768 B2* | 9/2004 | Bragansa et al. | 701/207 |
| 6,804,726 B1 | 10/2004 | Ellenby et al. | |
| 7,002,551 B2* | 2/2006 | Azuma et al. | 345/633 |
| 7,031,875 B2 | 4/2006 | Ellenby et al. | |
| 7,088,389 B2* | 8/2006 | Shibasaki et al. | 348/333.02 |
| 7,301,536 B2 | 11/2007 | Ellenby et al. | |
| 7,450,003 B2* | 11/2008 | Weber et al. | 340/539.2 |
| 7,456,847 B2* | 11/2008 | Krajec | 345/629 |
| 7,564,469 B2* | 7/2009 | Cohen | 345/632 |
| 7,728,869 B2* | 6/2010 | Jung | 348/231.2 |
| 7,737,965 B2* | 6/2010 | Alter et al. | 345/419 |
| 8,373,725 B2* | 2/2013 | Ryu | G06T 19/006 345/633 |
| 2003/0032436 A1 | 2/2003 | Mikuni | |
| 2005/0206654 A1* | 9/2005 | Vaha-Sipila | 345/632 |
| 2005/0228860 A1* | 10/2005 | Hamynen et al. | 709/203 |
| 2007/0027591 A1* | 2/2007 | Goldenberg et al. | 701/23 |
| 2007/0070186 A1* | 3/2007 | Fujimori et al. | 348/14.03 |
| 2007/0162942 A1* | 7/2007 | Hamynen et al. | 725/105 |
| 2007/0188408 A1* | 8/2007 | Jarczyk | G06T 11/20 345/9 |
| 2007/0200713 A1* | 8/2007 | Weber et al. | 340/573.1 |
| 2008/0132252 A1* | 6/2008 | Altman et al. | 455/457 |
| 2008/0182589 A1* | 7/2008 | Buccieri | 455/456.3 |
| 2008/0186164 A1* | 8/2008 | Emigh et al. | 340/539.13 |
| 2008/0268876 A1* | 10/2008 | Gelfand et al. | 455/556.1 |
| 2008/0280600 A1* | 11/2008 | Zhou | 455/415 |
| 2009/0005981 A1* | 1/2009 | Forstall et al. | 701/211 |
| 2009/0011707 A1* | 1/2009 | Ko | H04W 4/02 455/41.2 |
| 2009/0098888 A1* | 4/2009 | Yoon | 455/456.2 |
| 2009/0278948 A1* | 11/2009 | Hayashi | 348/218.1 |
| 2009/0289956 A1* | 11/2009 | Douris et al. | 345/633 |
| 2010/0004005 A1* | 1/2010 | Pereira et al. | 455/457 |
| 2010/0110105 A1* | 5/2010 | Kinnunen et al. | 345/629 |
| 2010/0176949 A1* | 7/2010 | Emigh et al. | 340/572.1 |
| 2010/0203904 A1* | 8/2010 | Khokhlov | 455/457 |
| 2010/0216491 A1* | 8/2010 | Winkler et al. | 455/457 |
| 2010/0229082 A1* | 9/2010 | Karmarkar et al. | 715/205 |
| 2010/0328344 A1* | 12/2010 | Mattila et al. | 345/633 |
| 2011/0141254 A1* | 6/2011 | Roebke et al. | 345/633 |
| 2011/0221771 A1* | 9/2011 | Cramer et al. | 345/633 |
| 2011/0254860 A1* | 10/2011 | Zontrop et al. | 345/633 |
| 2012/0003990 A1* | 1/2012 | Lee | 345/633 |
| 2012/0019557 A1* | 1/2012 | Aronsson et al. | 345/633 |
| 2013/0166191 A1* | 6/2013 | Gabara | G01C 21/367 701/409 |
| 2014/0327666 A1* | 11/2014 | Suzuki | G06T 19/006 345/419 |
| 2014/0375683 A1* | 12/2014 | Salter | G06F 3/013 345/633 |
| 2015/0378533 A1* | 12/2015 | Landau | G06F 3/0483 715/776 |

FOREIGN PATENT DOCUMENTS

| | | |
|---|---|---|
| WO | WO 02/063243 | 8/2002 |
| WO | WO 02073818 A1 * | 9/2002 |

* cited by examiner

METHOD, APPARATUS AND COMPUTER PROGRAM PRODUCT FOR DISPLAYING AN INDICATION OF AN OBJECT WITHIN A CURRENT FIELD OF VIEW

TECHNOLOGICAL FIELD

Embodiments of the present invention relate generally to augmented reality, and more particularly, relate to a method, apparatus and computer program for displaying an indication of an object within a current field of view.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to the utilization of positioning information now provided via many conventional mobile terminals. Positioning information can be used in various applications to identify the location of a mobile terminal. Further, as mobile terminals become increasingly integrated into daily activities, owners of mobiles terminals are rarely separated from them. As such, the positioning information provided by the device can be used to reliably locate the owner of the device.

Accordingly, many conventional applications are being implemented that utilize positioning information of mobile devices. Additionally, positioning information, not only associated with mobile terminals but more generally, has found increasing utilization in Augmented Reality (AR) applications. AR applications are generally thought of as the combination of real world data with computer generated data in a single medium. With the increasing availability of positioning information associated with mobile terminals, AR applications can be developed utilizing the positioning information.

As such, modern mobile devices hold the promise of making AR applications practical and universal. First, current mobile devices can be equipped with broadband wireless connectivity giving their users fast access to various information anywhere and anytime. Second, the need for AR is at its highest in a mobile setting. Third, the physical location of the device can be accurately estimated, through a number of means including GPS and cell tower location triangulation. These features make mobile devices an ideal platform for implementing and deploying AR applications.

Accordingly, it may be advantageous to provide applications that use positioning information provided by mobile terminals. In particular, it may be advantageous to utilize functionality provided on mobile terminals to combine real world data, such as positioning information, with computer generated data to implement AR applications.

BRIEF SUMMARY

A method, apparatus and computer program product are therefore provided to display an indication of an object within a current field of view. In this regard, various embodiments of the invention can access location information associated with an object. Further, a current field of view of an imaging device can be determined using location information and orientation information associated with an imaging device. If the object location information describes a location within the current field of view, a display of an indication of the object can be provided.

In some embodiments, a display of a live image can be provided. In this regard, the current field of view of the imaging device can describe a region depicted in the live image. Further, in some embodiments, a display of an indication of the object within the live image can be provided if the object location information describes a location within the current field of view. In some embodiments, a field of view center axis can be determined using the location information and the orientation information associated with an imaging device. Accordingly, an action based on a relationship between the field of view center axis and the object location information can be provided.

In some embodiments, a display of a map image can be provided. In this regard, a display of an indication of the object can be provided within the map image if the object location information describes a location within the current field of view. Further, in some embodiments, a field of view center axis can be determined using the imaging device location information and the imaging device orientation information. Further, an action can be provided based on a relationship between the field of view center axis and the location information of the object.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
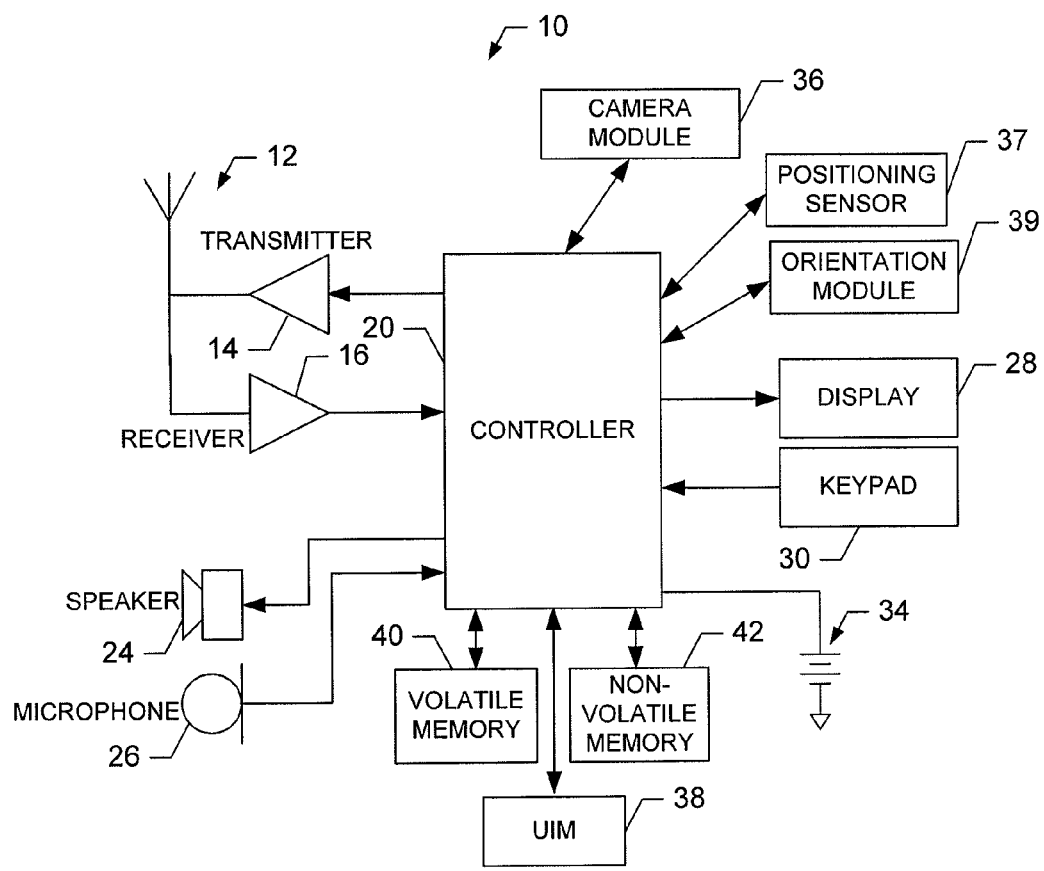
FIG. 1 is a schematic block diagram of a mobile terminal according to an embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that may benefit from embodiments of the present invention. It should be understood, however, that a mobile telephone as illustrated and hereinafter described is merely illustrative of one type of mobile terminal that may benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

Embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a processor, such as a controller 20 or other processing element or computing device, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 includes means, such as circuitry, desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a positioning sensor 37 such as, for example, a global positioning system (GPS) module in communication with the controller 20. The positioning sensor 37 may be any means, device or circuitry for locating the position of mobile terminal 10. The positioning sensor 37 may include all hardware for locating the position of a mobile terminal 10. Alternatively or additionally, the positioning sensor 37 may utilize a memory device of the mobile terminal 10 to store instructions for execution by the controller 20 in the form of software necessary to determine the position of the mobile terminal 10. Although the positioning sensor 37 of this example may be a GPS module, the positioning sensor 37 may include or otherwise alternatively be embodied as, for example, an assisted global positioning system (Assisted-GPS) sensor, or a positioning client, which may be in communication with a network device to receive and/or transmit information, such as a sky or floor sensor, for use in determining a position of the mobile terminal 10. In this regard, the position of the mobile terminal 10 may be determined by GPS, as described above, cell ID, signal triangulation, or other mechanisms as well. In one exemplary embodiment, the positioning sensor 37 includes a pedometer or inertial sensor. As such, the positioning sensor 37 may be capable of determining a location of the mobile terminal 10, with respect to, for example, longitudinal and latitudinal directions, and altitude direction of the mobile terminal 10, or a position relative to a reference point such as a destination or start point. Information from the positioning sensor 37 may then be communicated to a memory of the mobile terminal 10 or to another memory device to be stored as a position history or location information. Additionally, the positioning sensor 37 may be capable of utilizing the controller 20 to transmit/ receive, via the transmitter 14/receiver 16, location information such as the position of the mobile terminal 10.

Additionally, in some embodiments, mobile terminal 10 can include an orientation module 39. Orientation module 39 can determine the orientation of mobile terminal 10, i.e. the direction in which mobile terminal 10 is aimed. In some embodiments, the aimed direction can have a relationship to the positioning of a camera module 36 comprised within mobile terminal 10. The orientation module 39 can include means for determining the pan, pitch and yaw, which can collectively be referred to as orientation information, of mobile terminal 10. In some embodiments, orientation information can refer to some subset of pan, pitch, and yaw information. A means for determining pan, pitch and yaw can be an electronic compass, a horizon sensor, gravity sensor or any other sensor. Orientation information can include values for pan, pitch, and yaw. Pan can be the direction about a vertical axis, such as a compass heading. Pitch can be the direction about a horizontal axis, such as a direction with respect to the horizon. Yaw can be the positioning of mobile terminal 10 about an axis generated by the combination of the pan and the pitch. In this regard, the yaw of mobile terminal 10 can change when mobile terminal 10 is turned on its side. Orientation module 39 may be any means, device or circuitry for determining the orientation of mobile terminal 10. Orientation module 39 can be comprised of accelerometers, gyroscopes, electronic compasses, magnetometers and the like. Orientation module 39 may include all hardware for determining the orientation mobile terminal 10. Alternatively or additionally, the orientation module 39 may utilize a memory device of the mobile terminal 10 to store instructions for execution by the controller 20 in the form of software necessary to determine the orientation of the mobile terminal 10. Information from the orientation module 39 may then be communicated to a memory of the mobile terminal 10 or to another memory device to be stored as orientation information. Additionally, orientation module 39 may be capable of utilizing the controller 20 to transmit/receive, via the transmitter 14/receiver 16, orientation information such as the orientation of the mobile terminal 10.

In some embodiments, the orientation of the mobile terminal 10 may not be indicative of the orientation of a user of mobile terminal 10. For example, if a user of mobile terminal 10 is walking and keeping the mobile device in his/her pocket, the orientation of mobile 10 may not be indicative of the orientation of the user. As such, in some embodiments, the movement of mobile terminal 10 using positioning sensor 37 in conjunction with the orientation module 39 may be used to determine orientation information. For example, if the user is moving in a direction as indicated by changes in location information captured from positioning sensor 37, orientation module 39 can generate orientation information that indicates that the front of the user is oriented in the direction of the movement.

In some embodiments, the mobile terminal 10 includes a media capturing element, such as a camera, video and/or audio module, in communication with the controller 20. The media capturing element may be any means for capturing images, video and/or audio for storage, display or transmission. For example, in an exemplary embodiment in which the media capturing element is a camera module 36, the camera module 36 may include a selective capture mode where camera module 36 can form and save a digital image file from an image captured by camera module 36. In some embodiments, the camera module 36 can implement a preview mode where the current view from the camera module's optical hardware is displayed on, for example, display 28. In some embodiments, image data captured during preview mode is not saved for longevity, but rather continuously overwritten in order to depict the current view from the optical hardware. Additionally, while in preview mode a delay can exist due to, for example, hardware and software constraints. As such, a display of the current view of camera module 36 can be a display of the view from camera module 36 at a time in past that can be described by the current time minus the delay.

As such, the camera module 36 can include all hardware, such as a lens or other optical component(s), and software necessary for creating a digital image file from a captured image, in the selective capture mode, or for displaying the current view of the camera module, in a preview mode. Camera module 36 may also include all hardware, such as a lens or other optical component(s), and software necessary to provide image zooming functionality. Image zooming functionality can include the ability to magnify or de-magnify an image prior to or subsequent to capturing an image. Image zooming functionality can be used in selective capture mode and preview mode.

In either selective capture mode or preview mode, camera module 36 can operate in conjunction with positioning sensor 37 and orientation module 39 to associate the location and orientation information of mobile terminal 10, at the moment of image capture. In some embodiments, a subset of the location and orientation information of mobile terminal 10, at the moment of image capture, can be utilized. Similarly, a zoom level, indicating the degree that camera module 36 is zoomed at the moment of image capture, can be associated with a digital image file. For example, in preview mode, in some embodiments, a set of location information, orientation information and zoom level can be associated with each captured image frame, or at some lesser interval in which a common set of information is associated with each image frame capture within the interval. In some embodiments, the zoom level can include information regarding the aspect ratio of a captured image.

Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard or other format.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
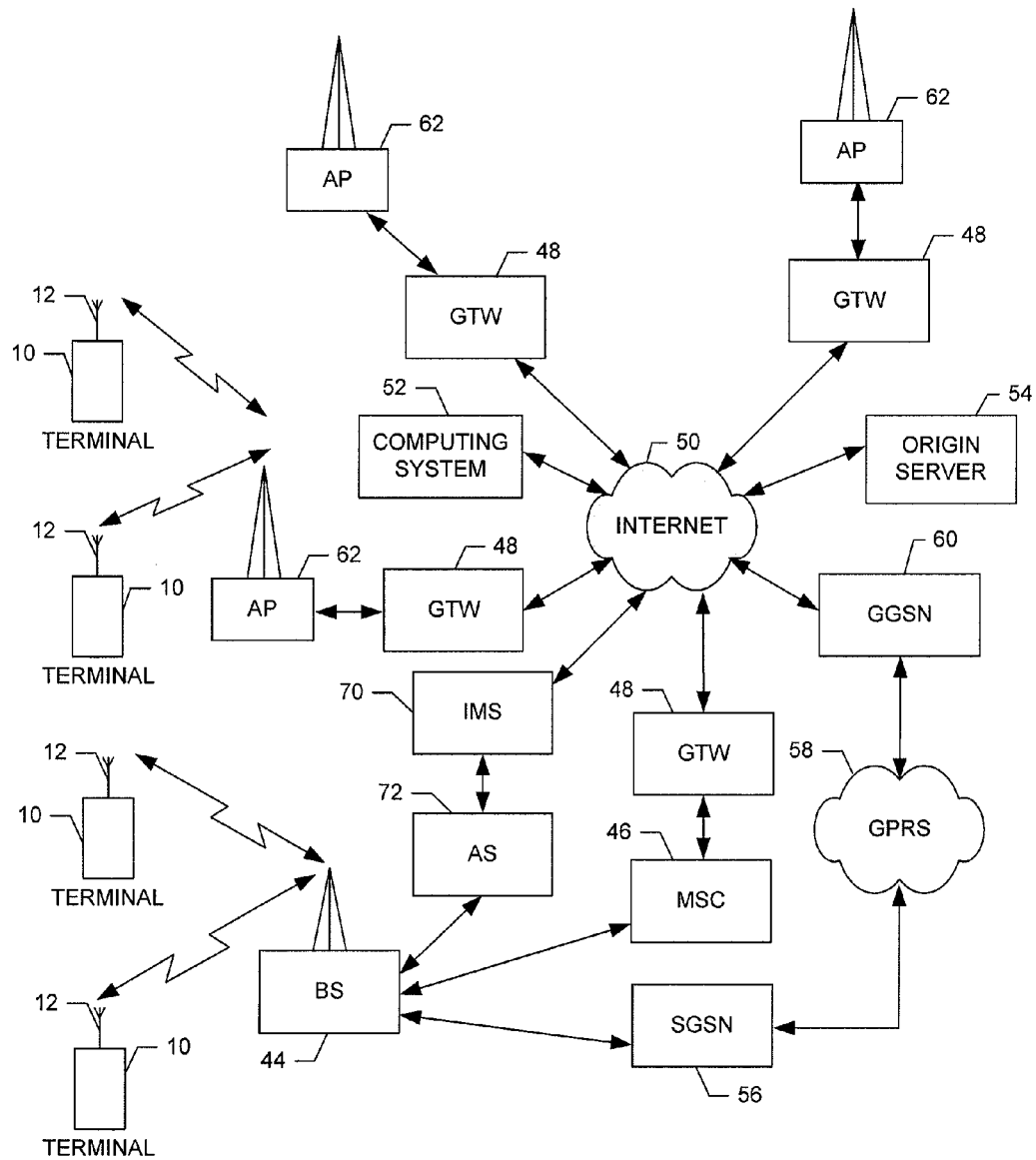
FIG. 2 is a schematic block diagram of a wireless communications system according to an embodiment of the present invention.

FIG. 2 is a schematic block diagram of a wireless communications system according to an exemplary embodiment of the present invention. Referring now to FIG. 2, an illustration of one type of system that may benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52, origin server 54, and/or the like, as described below.

The BS 44 can also be coupled to Internet 50 through an internet protocol multimedia subsystem (IMS) 70 and, in some embodiments, application service (AS) 72. As known to those skilled in the art, IMS can be an internet protocol multimedia subsystem which can provide a framework for delivering internet protocol multimedia to mobile terminals. IMS 70 can provide a link to Internet 50 in a packet switched domain. The link between BS 44 and Internet 50 through IMS 70 can also optionally include AS 72. AS 72 can be an application service that can provide functionality for managing communications sessions.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, and/or any of a number of other devices, to the Internet 50, the mobile terminals 10 can communicate with one another, the computing system, 52, the origin server 54, etc., to thereby carry out various functions of the mobile terminals 10, such as to transmit data, content or the like to, and/or receive content, data or the like from, the computing system 52, and/or the origin server 54, etc.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. Computing system 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing system 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

Figure 3:
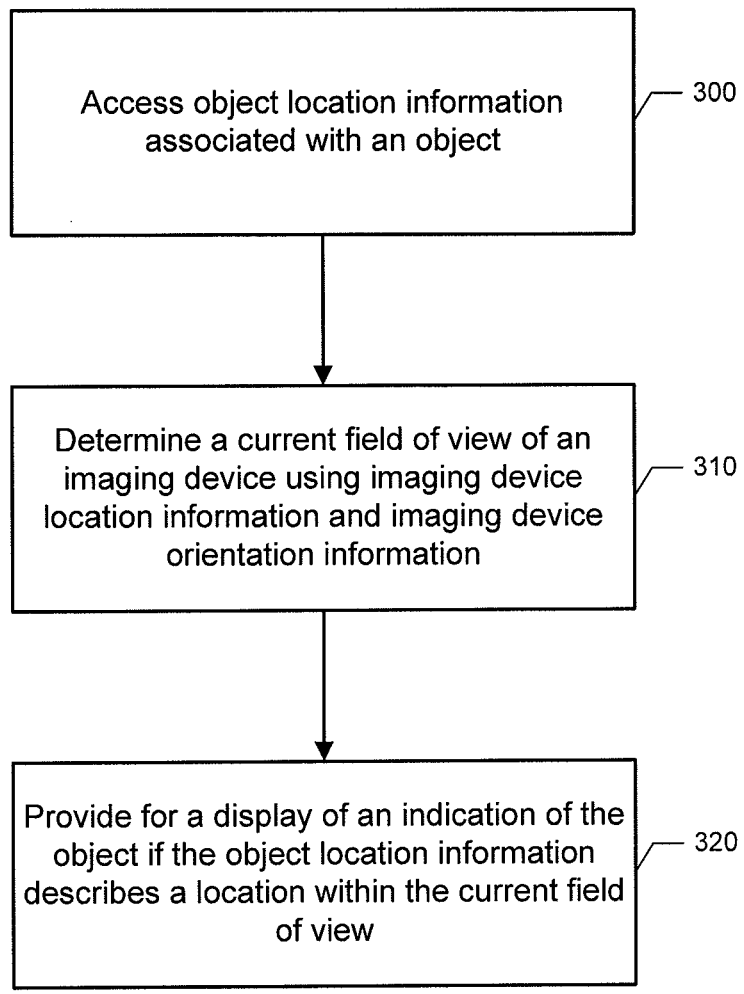
FIG. 3 is a flow chart of a method of displaying an indication of an object within a current field of view according to an embodiment of the present invention.

FIG. 3 depicts a flow chart of a method of displaying an indication of an object within a current field of view according to various embodiments of the present invention. The method of FIG. 3 can include the operations of accessing object location information associated with an object at 300, determining a current field of view of an imaging device using imaging device location information and imaging device orientation information at 310, and providing for a display of an indication of the object if the object location information describes a location within the current field of view at 320.

At 300, location information associated with an object can be accessed. Object location information can be accessed by controller 20 of mobile terminal 10 or other means. An object can be any entity real or virtual having associated location information. In some embodiments, an object can be mobile such as a person and the location information of the person can be retrieved from, for example, a mobile terminal 10 in the possession of the person. In some embodiments, an object can be stationary such as a landmark and location information can be retrieved from, for example, a street address in a phone book.

The object location information can be any type of information that describes the location of the object. For example, in some embodiments, the object location information can include longitude and latitude. Further, in some embodiments, the object location information can also include altitude. In some embodiments, location information associated with an object can be stored in a database. The database may reside on, for example, non-volatile memory 42 of mobile terminal 10. In some embodiments, the database can be a contacts list or a phonebook stored on a mobile terminal. As such, controller 20 of mobile terminal 10 can access the database, and in particular the object location information, via requests to non-volatile memory 42. In some embodiments, the database can be stored remote from the mobile terminal. As such, a communication system, such as the communications system of FIG. 2 can be used to access object location information.

In some embodiments, objects may be grouped within a category. For example, a user can define a landmark category, and designate various objects as member of the landmark category. In embodiments where categories are defined, object location information can be accessed for objects within particular categories. For example, if a category is defined and is selected, in some embodiments, object location information associated with only objects within the category can be accessed. Further, in some instances, objects may be included in a category for landmarks, restaurants, vehicle service stations, or the like. As such, categories can be defined by a user or a computerized method of defining categories can be used. In some embodiments, the set of objects within a category may be static, that is, the set objects within the category can remain constant given a constant data set. An example of a static category object set can be the family member category. On the other hand, in some embodiments, the set of objects within a category may be dynamic, that is, the set objects within the category can change given a constant data set. For example, if the category is defined based upon location of the objects, the movement of objects may change the composition of the category.

At 310, a current field of view of an imaging device can be determined. The current field of view of an imaging device can be determined by controller 20 of mobile terminal 10 or other means. The current field of view can be continuously determined at some regular or irregular interval. A current field of view can be the real-world area or volume that describes, using, for example, coordinates, the area or volume currently viewed from the imaging device, such as camera module 36 of mobile terminal 10 in preview mode. The current field of view can be described by a set of location coordinates, such as, for example, latitude and longitude. In some embodiments, the current field of view can be a volume which describes the three-dimensional volume depicted in the view of an imaging device. As such, in some embodiments, a current field of view can be described by a set of location coordinates that may include, for example, latitude, longitude and altitude coordinates. In some embodiments, location information, orientation information, and a zoom level, or some subset thereof, can be used to determine the set of location coordinates of the current field of view. In some embodiments, the content of the image captured by an imaging device can also be used to determine the current field of view, such as, by object recognition of objects known to be at a predefined location or by the recognition of addresses visibly notable in the image.

At 320, a display of an indication of the object can be provided if the object location information describes a location within the current field of view. The display of the indication of the object can be provided by controller 20 of mobile terminal 10 or other means. The indication of the object can be any media content item that has been associated with the object, such as, a picture, avatar, animation, text, or the like. For example, if a picture of a person is associated with an object, the display of the picture, as an indication of the object, can be provided. Accordingly, the indication of the object can be displayed when the location information of the object places the object in the current field of view. As such, a comparison can be made between the object location information that was accessed at 300, which can include object location information for a plurality of objects, and the current field of view that was determined at 310. As such, objects having object location information describing a location within the current field of view can be displayed.

FIGS. 4a through 4e depict example displays of electronic device according to various embodiments of the invention. However, the content of FIGS. 4a through 4e are used for illustration purposes and do not limit to scope of the invention to the embodiments depicted therein.

Figure 4A:
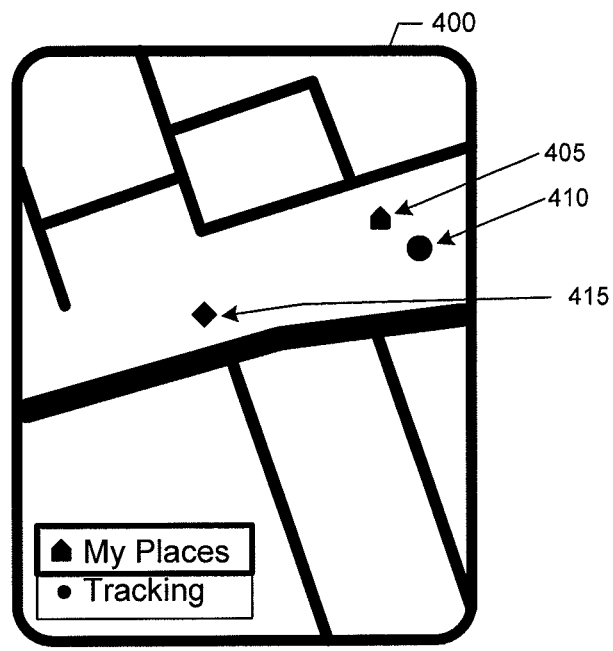
FIG. 4a is a display of a mobile terminal including a map diagram according to an embodiment of the present invention.

FIG. 4a depicts an example map area within a display 400 having various objects located within the map area. The example map area and example objects of FIG. 4a can be used to describe embodiments of the invention with respect to FIGS. 4b through 4e. In this example, user 415 can be located within the map area and be in possession of an electronic device having image, position and orientation capabilities. Object 405 can be an object that is a landmark. By accessing, for example, a phonebook, object location information and other information, such as a logo or other media item, associated with object 405 can be utilized. In this example, object 405 can be a coffee shop having object location information that describes the location where object 405 is located within the map area of display 400. Additionally, object 410 can be an object that is a person. Using information from, for example, a contacts list, object 410 can be associated with a person. In this example, a contact list can also contain a picture associated with object 410. Object 410 can also have associated object location information that describes the location where object 410 is located within the map area of display 400.

Figure 4B:
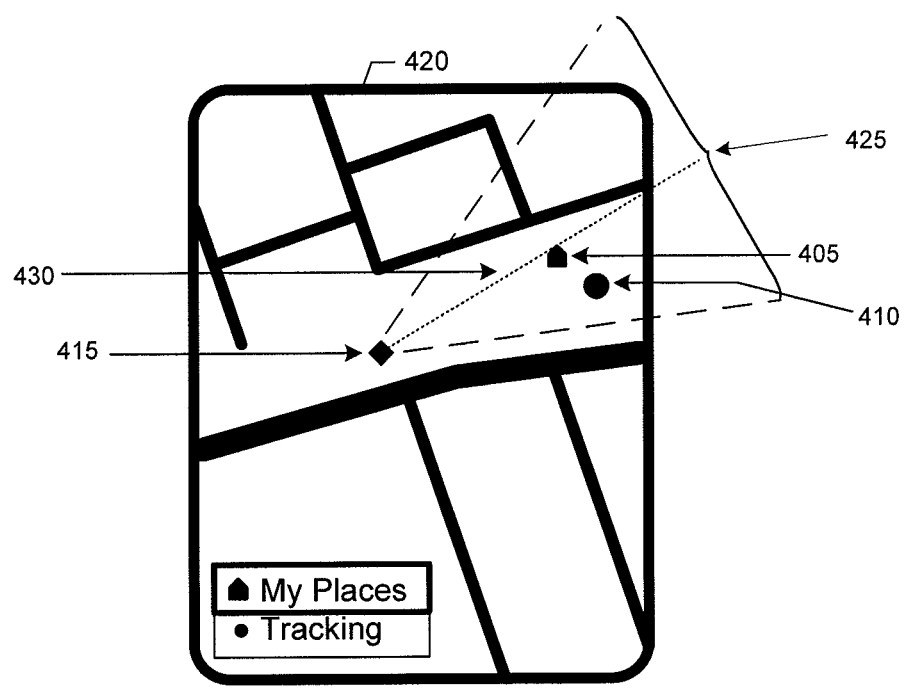
FIG. 4b is a display of a mobile terminal including a field of view according to an embodiment of the present invention.

FIG. 4b depicts a display of an electronic device driven by a processor, such as controller 20 of mobile terminal 10, that presents a field of view according to an embodiment of the present invention. FIG. 4b depicts an embodiment of the invention using the objects and information associated with FIG. 4a for illustration. The display 420 of FIG. 4b includes the map image depicted in display 400 of FIG. 4a. In some embodiments, the display of the map image can be provided by controller 20 of mobile terminal 10 or other means. The display 420 also includes objects 405 and 410, and reference to the location of a user of an imaging device 415.

The display 420 of FIG. 4b depicts an example situation where user 415 implements an imaging application on an electronic device, such as the preview mode of camera module 36. Using location information and orientation information associated with the electronic device, a current field of view 425 associated with the device can be defined. In accordance with various embodiments, the current field of view 425 can be superimposed on the map image to indicate the direction in which an imaging device is currently directed. According to various embodiments, a display of the current field of view, such as on a map image as depicted in FIG. 4b, can be determined, and in turn, provided by controller 20 of mobile terminal 10 or other means. Note that in the example display 420, objects 405 and 410 are located within current field of view 425. As such, in some embodiments, indications of objects 405 and 410 can be displayed because object location information associated with objects 405 and 410 describe locations within the current field of view 425. Further, in an example embodiment where a category has been selected such that only landmarks should be displayed, only an indication of object 405 would be displayed because object 405 is associated with an object that has been defined as a landmark, that is, a coffee shop.

Current field of view 425 can also have an associated field of view center axis 430. A field of view center axis can be determined using imaging device location and orientation information. In some embodiments, imaging device zoom information can also be used to determine a field of view center axis. In some embodiments, the field of view center axis can be located central to the current field in two or three dimensions. In some embodiments, the field of view center axis can be located in any predefined location within the current field of view, such as off center. A field of view center axis may be described by a point within the current field of view, a line within the current field of view, or a geometric plane within a current field of view. A field of view center axis can be determined by controller 20 or mobile terminal 10, camera module 36 of mobile terminal 10 or other means. In some embodiments, based on the relationship between object location information and the field of view center axis, an action can be performed with respect to an associated object. For example, when the field of view center axis is aimed or focused on a particular object, additional information regarding the object can be displayed in a pop-up window, the object may be selected and an application, such as a browser, that displays a variety of information can be implemented using information associated with the object, or a selection can be provided that can initiate a telephone call to the associated object. In some embodiments, a relationship between a field of view center axis that is sufficient to perform an action can be based on a distance measurement between the object and the field of view center axis with items less than threshold distance from the axis being considered sufficiently on-axis. In some embodiments, zooming functionality of an imaging device can assist in aiming or focusing the field of view center axis and may also change a distance relationship necessary to perform an action. For example, in some embodiments, as a device is zoomed out to produce a wider, de-magnified image, the threshold distance sufficient to perform an action with respect to an object can be increased.

Figure 4C:
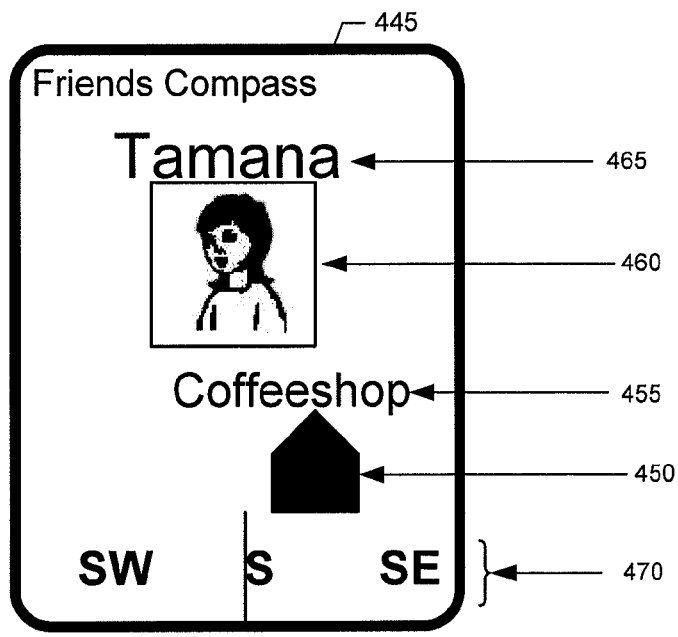
FIG. 4c is a display of a mobile terminal including an indication of an object according to an embodiment of the present invention.

FIG. 4c depicts a display of an electronic device driven by a processor, such as controller 20 of mobile terminal 10, that presents an indication of an object according to an embodiment of the present invention. FIG. 4c depicts a display generated in accordance with an embodiment of the invention using the objects and information associated with FIG. 4a for illustration. The display 445 of FIG. 4c includes a live image captured by an imaging device, such as the camera module 36 of mobile terminal 10 in a preview mode. Through the use of, for example, the preview mode of camera module 36, embodiments of the invention can be implemented without the use of map images. In some embodiments, the display of the live image can be provided by controller 20 of mobile terminal 10, camera module 36 of mobile terminal 10 or other means. The display 445 can also include an indication of a first object 450 and associated information 455, indication of a second object 460 and associated information 465, and compass display 470, as described below.

In display 445, the live image can depict the real world region that is located within the current field of view. With respect to the description of FIG. 4c, for illustration purposes, it is assumed that the current field of view of FIG. 4c is the same as the current field of view 425 of FIG. 4b. Similarly, indication of a first object 450 can be associated with object 405 and indication of a second object 460 can be associated with object 410. According to various embodiments, a display of the live image can be provided by controller 20 of mobile terminal 10, camera module 36 of mobile terminal 10 or other means.

Since objects 405 and 410 are located within current field of view 425, the indications of first and second objects 450, 460 can be displayed within the live image of display 445. As such, a user of an imaging device can scan the environment and identify various objects as the location information of objects fall within the current field of view of the imaging device. Controller 20 of mobile terminal 10, camera module 36 of mobile terminal 10 or other means can provide for the display of the indications of the first and second objects 450, 460 within the live image. In display 445, a picture associated with the object can be used as the indication of the second object 460. Similarly, in display 445, a media item or icon depicting a building structure that is associated with the object can be used as the indication of the first object 450. Further, information associated an object can be displayed with the indication of an object, such as associated information 455 and 465. Accordingly, associated information can be information associated with the object including, but not limited to, the name of the object, or the location of the object.

Further, in some embodiments, the indication of an object can be displayed within the live image at a location within the live image that is related to where the object location information is located within the current field of view. Similarly, depending on the distance between the location of the object and the location of the imaging device, the size of the display of the indication of an object can change. For example, closer objects may have larger indications of an object, and objects that are farther away may have smaller indications of an object. In some embodiments, only the indications of objects that are associated with objects that are within a selected category can be displayed.

Display 445 can also include a compass display 470. The compass display 470 can indicate to a user the current heading of an electronic compass that is associated with the imaging device. For example, the orientation module 39 of mobile terminal 10 can be used to provide the information depicted in the compass display 470.

Figure 4D:
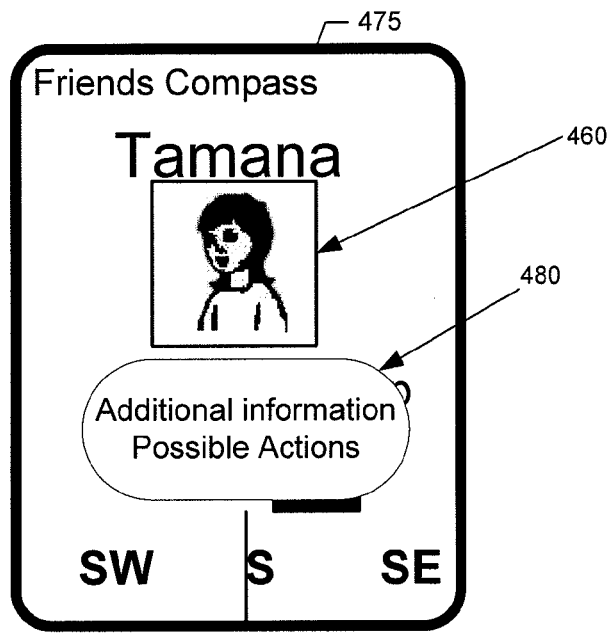
FIG. 4d is a display of a mobile terminal including an indication of an object according to an embodiment of the present invention.

FIG. 4d depicts a display of a display of an electronic device driven by a processor, such as controller 20 of mobile terminal 10, that presents an indication of an object according to an embodiment of the present invention. In the display 475 of FIG. 4d the user has aimed the imaging device such that the field of view center axis is within a threshold distance of the object associated with indication of an object 460. Accordingly, in the example display 475, the relationship between the location information associated with the indication of an object 460 and the field of view center axis is sufficient to cause an action to be performed. The example action can be to display additional information 480 and allow for selection of various other actions associated with the object.

Figure 4E:
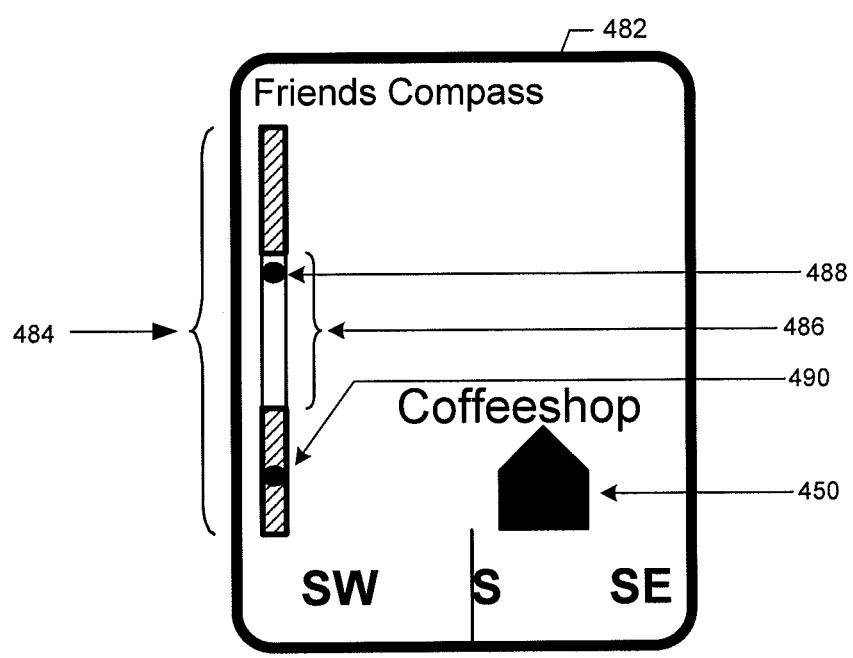
FIG. 4e is a display of a mobile terminal including a range control according to an embodiment of the present invention.

FIG. 4e depicts a display a display of an electronic device driven by a processor, such as controller 20 of mobile terminal 10, that presents a range control according to an embodiment of the present invention. The display 482 can include a range control 484, selected range 486, a first object icon 488, a second object icon 490, and an indication of an object 450. Range control 484 can be used to selectively control which indications of an object will be displayed based upon the distance from the imaging device to the object. For example, in some embodiments, a range can be selected such that only objects within some predetermined distance will have indications of the objects displayed. In other embodiments, a range may be defined between two distances, such as farther than 100 meters but closer than 200 meters. A range can be predefined or selected using any means such as through a keypad or touch screen. In the example display 482, the selected range 486 is set between two distances such that the range includes the first object icon 488. As such, the indication of an object 450 can be displayed within the live image since it is associated with the first object icon 488. However, the example selected range 486 of display 482, does not include the second object icon 490. Accordingly, even though the object location information associated with second object icon 490 is within the current field of view, it is not within the selected range, and as such, and indication of an object associated with second object icon 490 is not displayed.

According to one aspect of the present invention, the electronic device, such as mobile terminal 10, which implements embodiments of the present invention generally operates under control of a computer program product to capture an analyze the image, generate the displays and to present the displays annotated in the manner described above. The computer program product for performing the methods of embodiments of the present invention includes a computer-readable storage medium and computer-readable program code portions, such as a series of computer instructions, embodied in the computer-readable storage medium.

In this regard, FIG. 3 is a flowchart of method, apparatus and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus, such as controller 20, to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    determining a current field of view of an imaging device using imaging device location information and imaging device orientation information;
    receiving a signal comprising object location information indicating a presence of a mobile terminal in the current field of view;
    accessing a stored contacts list to associate the mobile terminal with a person identified in the stored contacts list;
    causing a map image to be displayed such that the field of view is superimposed on the map image;
    causing an indication of the mobile terminal to be displayed within the map image, wherein the indication enables access to information from the stored contact list based on the person associated with the mobile terminal;
    receiving an indication via a range control of a selected range within the field of view;
    causing the indication of the mobile terminal to disappear from the map image in an instance where the mobile terminal is located outside the selected range, wherein a representation of the mobile terminal for which the indication has disappeared from the map image continues to be displayed by the range control;
    providing a plurality of communication options to initiate communication with the mobile terminal;
    receiving a selection of at least one of the plurality of communication options; and
    causing communication with the mobile terminal using the selected communication option.

2. The method of claim 1 further comprising:
    determining a field of view center axis using the imaging device location information and the imaging device orientation information.

3. The method of claim 1 wherein receiving the object location information comprises receiving object location information for objects within a predetermined category.

4. The method of claim 1, wherein the signal is received from the mobile terminal.

5. The method of claim 1, further comprising:
    updating orientation information relating to movement of the imaging device; and
    causing the map image to update based on the movement.

6. An apparatus comprising at least one processor and at least one memory including computer program code, the at least one memory and the computer program code configured to, with the at least one processor, cause the apparatus at least to:
    determine a current field of view of an imaging device using device location information and imaging orientation information;
    receive a signal comprising object location information indicating a presence of a mobile terminal in the current field of view;
    access a stored contacts list to associate the mobile terminal with a person identified in the stored contacts list;
    cause a map image to be displayed such that the field of view is superimposed on the map image;
    cause an indication of the mobile terminal to be displayed within the map image, wherein the indication enables access to information from the stored contact list based on the person associated with the mobile terminal;
    receive an indication via a range control of a selected range within the field of view;
    cause the indication of the mobile terminal to disappear from the map image in an instance where the mobile terminal is located outside the selected range, wherein a representation of the mobile terminal for which the indication has disappeared from the map image continues to be displayed by the range control;
    provide a plurality of communication options to initiate communication with the mobile terminal;
    receive a selection of at least one of the plurality of communication options; and
    cause communication with the mobile terminal using the selected communication option.

7. The apparatus of claim 6 wherein the at least one memory and the computer program code are further configured to, with the at least one processor, cause the apparatus to:
    determine a field of view center axis using the imaging device location information and the imaging device orientation information.

8. The apparatus of claim 6, wherein the signal is received from the mobile terminal.

9. The apparatus of claim 6, wherein the at least one memory and the computer program code are further configured to, with the at least one processor, cause the apparatus to:
    update orientation information relating to movement of the imaging device; and
    cause the map image to update based on the movement.

10. A computer program product comprising at least one non-transitory computer-readable storage medium having computer-executable program code stored therein, the computer-executable program code comprising program code instructions to:
    determine a current field of view of an imaging device using imaging device location information and imaging device orientation information;
    receive a signal comprising object location information indicating a presence of a mobile terminal in the current field of view;
    access a stored contacts list to associate the mobile terminal with a person identified in the stored contacts list;
    cause a map image to be displayed such that the field of view is superimposed on the map image;
    cause an indication of the mobile terminal to be displayed within the map image;

receive an indication via a range control of a selected range within the field of view;

cause the indication of the mobile terminal to disappear from the map image in an instance where the mobile terminal is located outside the selected range, wherein a representation of the mobile terminal for which the indication has disappeared from the map image continues to be displayed by the range control;

provide a plurality of communication options to initiate communication with the mobile terminal wherein the indication enables access to information from the stored contact list based on the person associated with the mobile terminal;

receive a selection of at least one of the plurality of communication options; and cause communication with the mobile terminal using the selected communication option.

11. The computer program product of claim 10, the computer-executable program code instructions further comprising program code instructions to:

determine a field of view center axis using the imaging device location information and the imaging device orientation information.

12. The computer program product of claim 10, wherein the signal is received from the mobile terminal.

13. The computer program product of claim 10, the computer-executable program code instructions further comprising program code instructions to:

update orientation information relating to movement of the imaging device; and cause the map image to update based on the movement.

* * * * *